(12) United States Patent
Gale et al.

(10) Patent No.: US 7,880,430 B2
(45) Date of Patent: Feb. 1, 2011

(54) POWER SYSTEM AND METHOD

(75) Inventors: Allan Roy Gale, Livonia, MI (US);
Michael W. Degner, Novi, MI (US);
Michael Alan Tamor, Toledo, OH (US);
Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/780,370

(22) Filed: May 14, 2010

(65) Prior Publication Data

US 2010/0262314 A1  Oct. 14, 2010

Related U.S. Application Data

(63) Continuation of application No. 12/423,158, filed on Apr. 14, 2009.

(51) Int. Cl.
*H01M 10/46* (2006.01)
(52) U.S. Cl. ...................................... 320/109
(58) Field of Classification Search ............. 320/107, 320/109, 138, 160; 323/211, 214
See application file for complete search history.

(56) References Cited

U.S. PATENT DOCUMENTS

| | | | |
|---|---|---|---|
| 4,356,440 A * | 10/1982 | Curtiss et al. | 322/20 |
| 4,920,475 A | 4/1990 | Rippel | |
| 5,099,186 A | 3/1992 | Rippel et al. | |
| 5,341,075 A | 8/1994 | Cocconi | |
| 5,504,414 A | 4/1996 | Kinoshita | |
| 5,581,171 A | 12/1996 | Kerfoot et al. | |
| 5,629,603 A | 5/1997 | Kinoshita | |
| 5,642,270 A | 6/1997 | Green et al. | |
| 6,087,802 A | 7/2000 | James | |
| 6,121,758 A * | 9/2000 | Bellina et al. | 323/211 |
| 6,160,374 A | 12/2000 | Hayes et al. | |
| 6,204,630 B1 | 3/2001 | James | |
| 2004/0062059 A1 | 4/2004 | Cheng et al. | |
| 2008/0290845 A1 * | 11/2008 | Holveck et al. | 323/214 |

OTHER PUBLICATIONS

James P. Noon et al., UC3855A/B High Performance Power Factor Preregulator, Unitrode Corporation, U-153, pp. 1-20, 1999.
James P. Noon, A 250kHz, 500W Power Factor Correction Circuit Employing Zero Voltage Transitions, Unitrode Corporation, pp. 1-1 to 1-16, Oct. 1994, Texas Instruments Incorporated.
Yijing Chen, et al., Control of a Single-Phase PFC Preregulataor [sic] Using an 8-Bit Microcontroller, pp. 1454-1460, 1-4244-0714-1/07, 2007, IEEE.

* cited by examiner

*Primary Examiner*—Edward Tso
(74) *Attorney, Agent, or Firm*—David B. Kelly; Brooks Kushman P.C.

(57) ABSTRACT

A power system may include at least one controller configured to determine a net reactive power on at least one power distribution circuit and to issue at least one request for offsetting reactive power based on the determination to reduce the net reactive power on the at least one power distribution circuit.

18 Claims, 2 Drawing Sheets

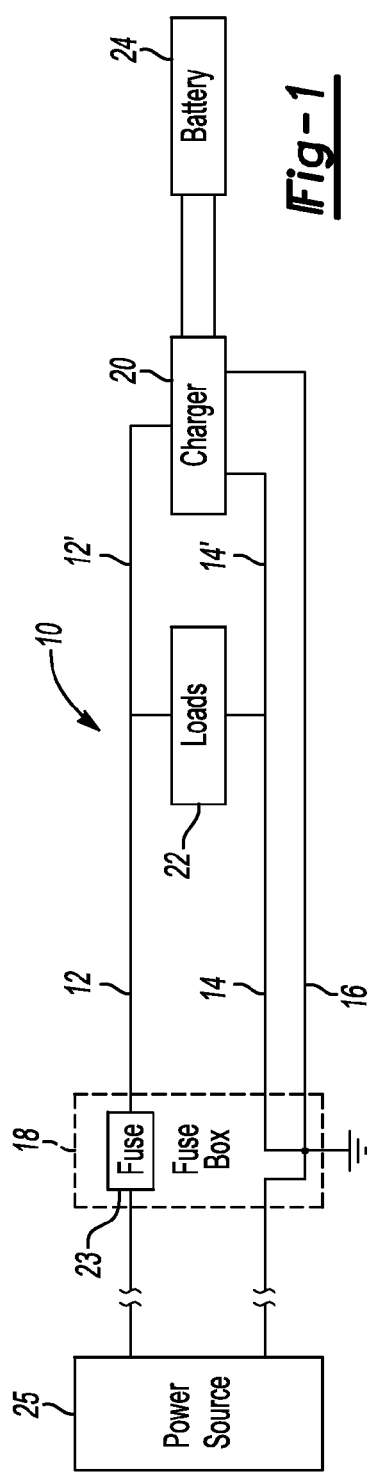
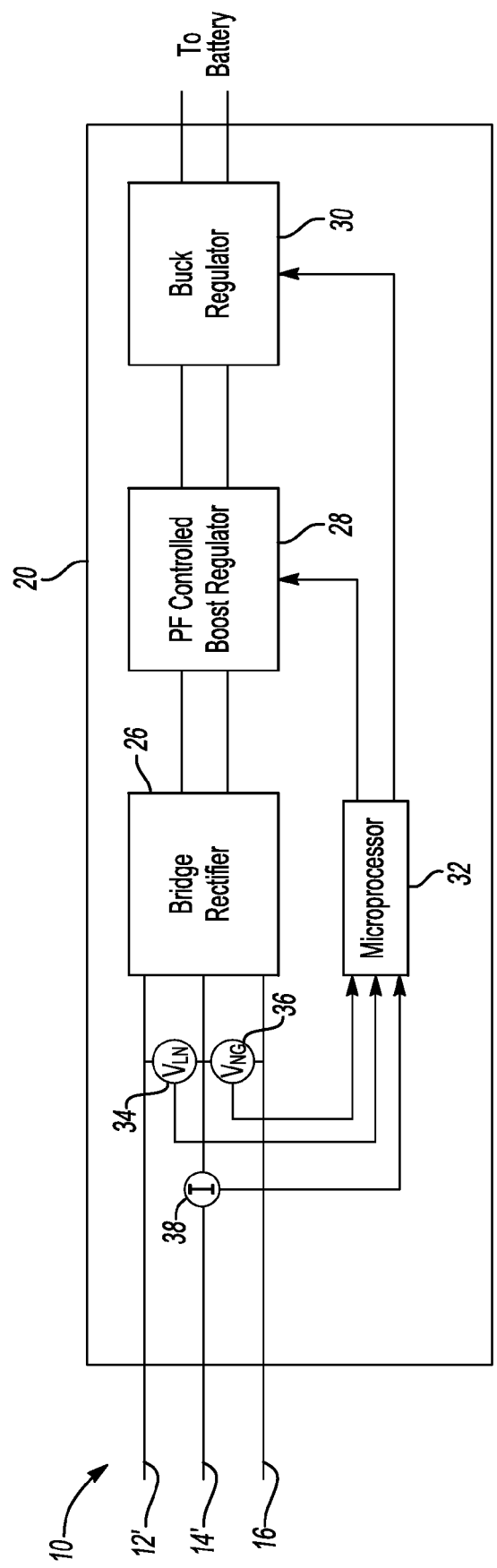

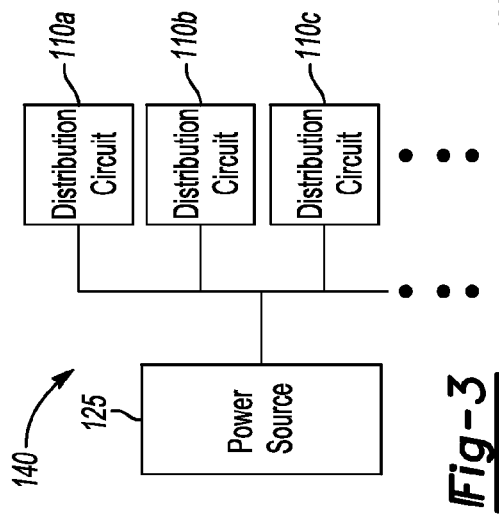
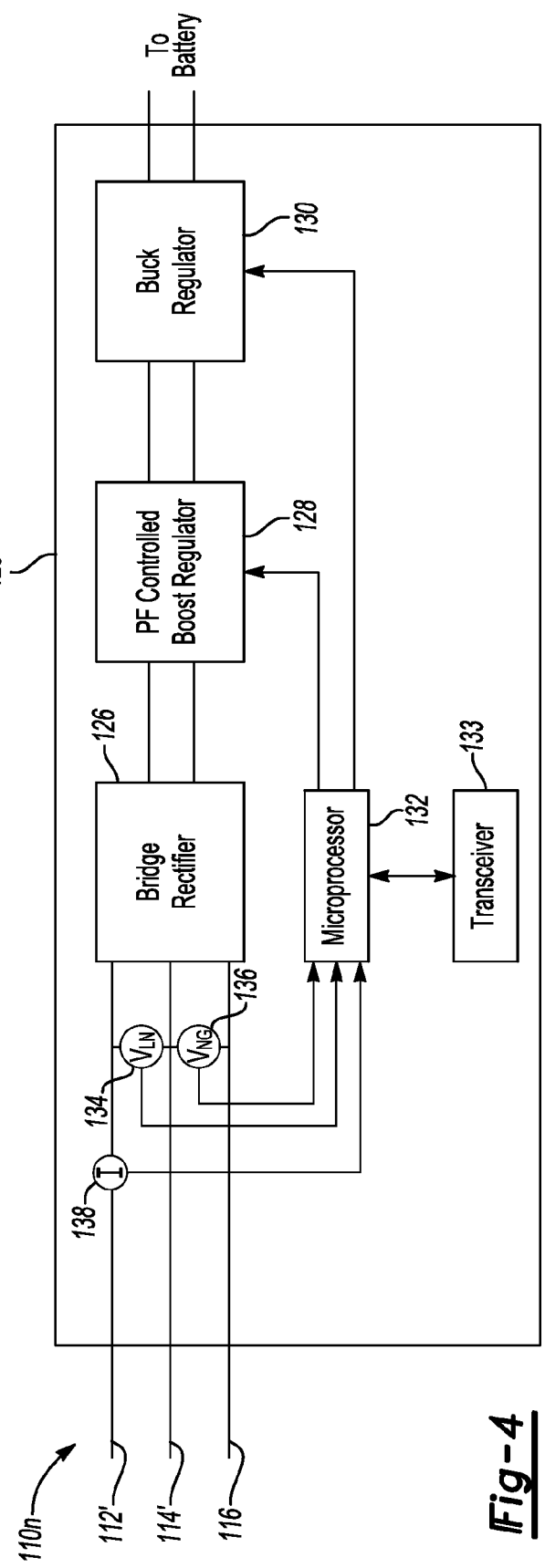

POWER SYSTEM AND METHOD

CROSS-REFERENCE TO RELATED APPLICATION

This application is a continuation of U.S. application Ser. No. 12/423,158, filed Apr. 14, 2009, which is hereby incorporated by reference in its entirety.

BACKGROUND

Real power is the capacity of a circuit for performing work in a particular time. Apparent power is the product of the current and voltage of the circuit. The apparent power may be greater than the real power due to energy stored in the load and returned to the source, or due to a non-linear load that distorts the wave shape of the current drawn from the source.

The power factor of an AC electric power system may be defined as the ratio of the real power flowing to the load to the apparent power (a number between 0 and 1).

In an electric power system, a load with a low power factor draws more current than a load with a high power factor, for the same amount of useful power transferred. The higher currents may increase the energy lost in the distribution system, and may require larger wires and other equipment. Because of the costs of larger equipment and wasted energy, electrical utilities may charge a higher cost to customers with a low power factor.

In a purely resistive AC circuit, voltage and current waveforms are in phase, changing polarity at the same instant in each cycle. Where reactive loads are present, such as with capacitors or inductors, energy storage in the loads results in a time difference (phase) between the current and voltage waveforms. This stored energy returns to the source and is not available to do work at the load. Thus, a circuit with a low power factor will have higher currents to transfer a given quantity of real power compared to a circuit with a high power factor.

AC power flow has the three components: real power (P) measured in watts (W); apparent power (S) measured in volt-amperes (VA); and reactive power (Q) measured in reactive volt-amperes (VAr). Power factor may thus be defined as $$P/S \quad (1)$$

In the case of a perfectly sinusoidal waveform, P, Q and S can be expressed as vectors that form a vector triangle such that $$S^2 = P^2 + Q^2 \quad (2)$$

If θ is the phase angle between the current and voltage, then the power factor is equal to |cos θ|, and $$P = S^* |\cos \theta| \quad (3)$$

When power factor is equal to 0, the energy flow is entirely reactive, and stored energy in the load returns to the source on each cycle. When the power factor is equal to 1, all the energy supplied by the source is consumed by the load. Power factors may be stated as "leading" or "lagging" to indicate the sign of the phase angle.

If a purely resistive load is connected to a power supply, current and voltage will change polarity in phase, the power factor will be unity, and the electrical energy will flow in a single direction across the network in each cycle. Inductive loads such as transformers and motors consume power with the current waveform lagging the voltage. Capacitive loads such as capacitor banks or buried cables cause reactive power flow with the current waveform leading the voltage. Both types of loads will absorb energy during part of the AC cycle, which is stored in the device's magnetic or electric field, only to return this energy back to the source during the rest of the cycle. For example, to get 1 kW of real power, if the power factor is unity, 1 kVA of apparent power needs to be transferred (1 kW÷1=1 kVA). At low values of power factor, however, more apparent power needs to be transferred to get the same real power. To get 1 kW of real power at 0.2 power factor, 5 kVA of apparent power needs to be transferred (1 kW÷0.2=5 kVA).

SUMMARY

A power system for at least one power distribution circuit may include a power source configured to issue a request for offsetting reactive power to reduce a net reactive power on the at least one power distribution circuit.

BRIEF DESCRIPTION OF THE DRAWINGS

FIG. 1 is a schematic diagram of an embodiment of a power distribution circuit.

FIG. 2 is a block diagram of an embodiment of the battery charger of FIG. 1.

FIG. 3 is a block diagram of an embodiment of a power distribution system.

FIG. 4 is a block diagram of another embodiment of a battery charger.

DETAILED DESCRIPTION

Referring now to FIG. 1, a power distribution circuit 10 may include power lines (lines) 12, 12' return lines (neutrals) 14, 14' and a ground line (ground) 16 and may be similar to, in some embodiments, power distribution circuits found in residential or commercial buildings. A fuse box 18, battery charger 20 and other loads 22 are electrically connected with the distribution circuit 10. (The battery charger 20 may, for example, be a stand alone unit or integrated within a vehicle.) The line 12 and neutral 14 are that portion of the circuit 10 electrically connected between the fuse box 18 and loads 22. The line 12' and neutral 14' are that portion of the circuit 10 electrically connected between the charger 20 and loads 22.

The fuse box 18 includes a fuse 23 electrically connected with the line 12.

A power storage unit 24, e.g., vehicle traction battery, may be electrically connected with (and charged by) the battery charger 20.

As known to those of ordinary skill, power from a power source 25, e.g., utility grid, etc., is delivered to the distribution circuit 10 (and thus the battery charger 20 and loads 22) via the fuse box 18.

In the embodiment of FIG. 1, the loads 22, (such as a refrigerator compressor, etc.) have both real and reactive power components (resulting in an AC current that lags the AC voltage.) This lagging current causes reactive power to flow between the loads 22 and power source 25. (This reactive power flow will result in a current through the fuse 23, for a given real power, that is greater than the current through the fuse 23 in the absence of this reactive power flow.) The loads 22 thus lower the power factor associated with the distribution circuit 10 and decrease the real power available for a given amount of apparent power.

As explained below, the battery charger 20 may determine the power factor of the distribution circuit 10 and operate so as to reduce and/or eliminate reactive power flow on the lines 12, 14 caused by the loads 22. (As apparent to those of ordinary skill, this reduction/elimination will be accompanied by an increase in reactive power flow on the lines 12', 14'.)

Referring now to FIGS. 1 and 2, an embodiment of the battery charger 20 may include a bridge rectifier 26, power factor (PF) controlled boost regulator 28, buck regulator 30 and microprocessor 32. Of course, the battery charger 20 may have any suitable configuration. The bridge rectifier 26 may be electrically connected with the line 12', neutral 14' and ground 16 of the distribution circuit 10. The PF controlled boost regulator 28 is electrically connected with the bridge rectifier 26 and buck regulator 30. The buck regulator 30 may be electrically connected with the power storage unit 24. The PF controlled boost regulator 28 and buck regulator 30 are under the command/control of the microprocessor 32.

The battery charger 20 may also include voltage sensors 34, 36 and a current sensor 38. The voltage sensor 34 measures the voltage between the line 12' and neutral 14'. The sensor 36 measures the voltage between the neutral 14' and ground 16. (As apparent to those of ordinary skill, this voltage is dependent on the current through the neutrals 14, 14'.) The sensor 38 measures the current through the neutral 14'. The sensors 34, 36, 38 are in communication with the microprocessor 32.

If the charger 20 is not operating, all load current due to the loads 22 passes through the neutral 14. The neutral 14, having an internal resistance $R_{14}$, experiences a voltage drop between the loads 22 and fuse box 18 that is proportional to, and in phase with, the current through the loads 22. This voltage drop can be measured at the charger 20 by the sensor 36. If the loads 22 contain a reactive component, the voltage measured by the sensor 36 will be out of phase with the voltage measured by the sensor 34. From (5) (discussed below), the power factor can thus be computed.

If the loads 22 were absent, the charger 20 could produce the same voltage drop by charging at a rate that causes a current through the neutrals 14, 14' that is equal to:

$$((R_{14}+R_{14'})*I_{charger})/R_{14} \quad (4)$$

where $R_{14'}$ is the internal resistance of the neutral 14' and $I_{charger}$ is the current through the charger 20 (the current through the sensor 38).

If the charger 20 is operating and the loads 22 are present, the reactive component of power due to these combined loads will have an associated current that can be determined based on the measured voltage 36. Due to this component of current, the measured voltage waveform at the sensor 36 ($V_{NG}$) will be out of phase with the measured voltage waveform at the sensor 34 ($V_{LN}$). If the charger 20 is commanded to operate as a load with a reactive power such that the measured voltage waveform at the sensor 36 is substantially aligned with the measured voltage waveform at the sensor 34, the power at the fuse box 18 will have little or no reactive component.

From (4), if $R_{14'}$ is small relative to $R_{14}$, the charger current necessary to correct and align the phase of $V_{NG}$ with $V_{LN}$ will be approximately equal to the current magnitude and phase of the example above where the charger 20 is not operating and thus all load current due to the loads 22 passes through the neutral 14. If $R_{14'}$ is not small relative to $R_{14}$, a portion of reactive power may still be observed at the fuse box 18.

The microprocessor 32 may determine the power factor (and thus differences in phase between the voltage and current) of the distribution circuit 10 based on information from the sensors 34, 36. For example, the microprocessor 32 may determine the power factor based on the period, T, of the voltage waveform as measured by the sensor 34 and the phase between the voltage waveforms as measured by the sensors 34, 36. Other suitable techniques, however, may also be used.

To find T, for example, the microprocessor 32 may determine the time between two consecutive zero-crossings of the voltage waveform as measured by the sensor 34, and multiply this time by a factor of 2. Alternatively, the microprocessor 32 may determine the time between alternate zero-crossings of the voltage waveform as measured by the sensor 34. Other schemes are also possible.

To find the phase between the voltage waveforms as measured by the sensors 34, 36, the microprocessor 32 may determine the time, t, between a zero-crossing of the voltage waveform as measured by the sensor 34 and an immediately subsequent zero-crossing of the voltage waveform as measured by the sensor 36.

The microprocessor 32 may then find the power factor of the distribution circuit 10 as $$PF=\cos((t/T)*360) \quad (5)$$

The microprocessor 32 may communicate this power factor to the PF controlled boost circuit 28. The PF controlled boost circuit 28 (which may take the form of circuitry described in the UNITRODE Application Note "UC3854 Controlled Power Factor Correction Circuit Design" by Philip C. Todd, 1999, or any other known and/or suitable form) may control the power drawn in order to correct for reactive power caused by the loads 22. This control may be accomplished, for example, with the addition of a digital or analog lead/lag of the current measured by the sensor 38 (or by a lag/lead of the voltage measured by the sensor 34) prior to the signal being processed by the PF controlled boost circuit 28. In this example, a lag in the current signal will produce a corresponding lead in the power factor at the input of the charger 20, and the PF controlled boost circuit 28 will no longer be drawing unity PF at its input as originally intended. Conversely, a lead will produce a corresponding lag in the power factor at the input of the charger 20, etc.

If the loads 22 are motors, for example, they will typically have an inductive reactance, Xl, that will cause a lagging power factor. A leading power factor equivalent to a capacitive reactance, Xc, may be provided such that Xc≈Xl. With this approximate match, little or no reactive power will flow on the line 12 and neutral 14, and will instead flow on the line 12' and neutral 14'.

If the reactive power needed to correct for reactive power caused by the loads 22 is known, the PF controlled boost regulator 28 may be directed to produce the needed (complementary) reactive power. Alternatively, considering (4) and the prior discussion of current produced voltages at the sensor 36, for small values of $R_{14'}$ relative to $R_{14}$ there will be little or no reactive power flow through the line 12, neutral 14 and fuse 23, and $V_{NG}$ will be in phase with $V_{LN}$. Even for larger values of $R_{14'}$, when $V_{NG}$ is in phase with $V_{LN}$, the reactive power flow through the line 12, neutral 14, and fuse 23 will be reduced. Of course, if the reactive power of the loads 22 is known, the reactive power produced current can be directly calculated and controlled.

Control signal inputs to the PF controlled boost circuit 28 may be based on the voltage (rectified) between the lines 12', 14', and the magnitude of the voltage between the lines 14', 16 (which, of course, is proportional to the current through the neutrals 14, 14'). As apparent to those of ordinary skill, the above control signal input scheme allows the PF controlled boost circuit 28 to substantially correct the power factor of the distribution circuit 10 (as opposed to just the battery charger 20.)

The boost circuit 28 may measure, in a known fashion, the rectified AC voltage from the bridge rectifier 26 and control, in a known fashion, the current, i, through its inductor such that the instantaneous value of the magnitude of i is proportional to the instantaneous value of the magnitude of the voltage between lines 14', 16.

If the battery charger 20 is the only load on the distribution circuit 10, the line 12 will have a power factor of approximately unity. (Because the current, i, is proportional to the AC voltage on the line 12 (they are in phase), the power factor of the distribution circuit 10 is unity.) If, however, there are additional loads, such as loads 22, with reactive components, the distribution circuit 10 will also have a power factor of approximately unity at the fuse box 18 because of the control input scheme discussed above.

Assuming the microprocessor 32 finds the power factor for the distribution circuit 10 as discussed above, it may control the PF controlled boost circuit 28 so as to produce reactive power sufficiently equal (and of opposite sign) to the reactive power caused by the loads 22. The reactive power produced by the PF controlled boost circuit 28 will thus cancel with the reactive power of the distribution circuit 10 and increase the real power for a given amount of apparent power.

From (2) and (3), and assuming a lagging power factor of 0.8 and an apparent power of 375 VA for the distribution circuit 10, the real power is approximately equal to 300 W and the reactive power is approximately equal to 225 VAr (current lagging voltage in this example). The PF controlled boost circuit 28 may thus operate to produce approximately 225 VAr (current leading voltage) and drive the apparent power to a value of 300 VA. Operation of the battery charger 20 may thus increase the efficiency at which power is delivered by the distribution circuit 10 under circumstances where non-power factor corrected loads (such as the loads 22 illustrated in FIG. 1) are electrically connected with the distribution circuit 10. In this example, the distribution circuit 10 would need to provide 3.125 A at 120 V to provide the 375 VA of power. With the reactive power component substantially eliminated, the distribution circuit 10 would only need to provide 2.5 A at 120 V to provide the 300 W of power. (Thus, an additional 0.6 A of real current could now be drawn by the battery charger 20 without changing the amount of apparent current flowing through the fuse 23.)

Referring now to FIG. 3 (where like numerals have similar descriptions to FIG. 1), a power distribution system 140 includes a power source 125 and several power distribution circuits 110n (110a, 110b, 110c, etc.). The power source 125 of FIG. 3 is configured to provide power to the distribution circuits 110n.

Reactive loads electrically connected with the distribution system 140 via the distribution circuits 110n may cause a net leading or lagging reactive power. As discussed above, this net reactive power may cause inefficiencies in power delivery within the distribution system 140.

In the embodiment of FIG. 3, the power source 125 may request offsetting reactive power (leading or lagging) to be produced/generated by any battery chargers similar to those described with reference to FIG. 2 and electrically connected with the distribution circuits 110n. In other embodiments, the power source 125 may request offsetting reactive power to be produced/generated by other suitably controlled loads or added power sources capable of modifying, upon request, the power factor of the distribution circuits 110n in a manner similar to the battery chargers described herein. Such loads or added power sources, for example, may have an architecture and input control scheme similar to the battery charger 20 of FIG. 2.

The power source 125 may include, for example, a wireless transmitter/transceiver or modulator (for power line communication) to communicate such requests for reactive power (and receive information from battery chargers as explained below). Any suitable information transmission technique, however, may be used.

Referring now to FIGS. 3 and 4 (where like numerals have similar descriptions to FIG. 2), an embodiment of a battery charger 120 may include a bridge rectifier 126, PF controlled boost regulator 128, buck regulator 130, microprocessor 132 and transceiver 133. The microprocessor 132 is in communication with the transceiver 133. The battery charger 120 may also include voltage sensors 134, 136 and a current sensor 138.

The transceiver 133 is configured to transmit and/or receive wireless signals in a known fashion. The transceiver 133 may, for example, receive requests/commands for reactive power (of a particular sign) wirelessly transmitted by the power source 125 in a known fashion. These requests/commands may then be forwarded to the microprocessor 132 for processing. In other embodiments, the battery charger 120 may include HOMEPLUG-like (or similar) technology for receiving and/or transmitting over-the-wire communications from and/or to the power source 125. As apparent to those of ordinary skill, such a HOMEPLUG module would be electrically connected with the power and return lines 112', 114'. As known in the art, with HOMEPLUG, information is supper-imposed on AC lines at particular frequencies. With appropriate circuitry, this information can be read at the receiving end.

The microprocessor 132 may use the requested/commanded reactive power as a target by which to "tune" the reactive power of the distribution circuit 110n. For example, if 5 VAr total of reactive power (current leading voltage) is needed to substantially correct the power factor of the distribution system 140, and the microprocessor 132 has determined, using the techniques described herein, that 1 VAr (current leading voltage) is available to be produced by the charger 120, the microprocessor 132, in response to a request for reactive power (current leading voltage) from the power source 125, may control the PF controlled boost regulator 128 to produce 1 VAr of reactive power (current leading voltage) by, for example, controlling the digital or analog lead/lag of the current measured by the sensor 138 (or the lag/lead of the voltage measured by the sensor 134) as discussed above (thus driving the reactive power of the distribution circuit 110n to 4 VAr (voltage leading current)).

The microprocessor 132 may also determine the capacity of the battery charger 120 to cause a specified reactive power to be present on the distribution circuit 110 and communicate this information to the power source 125 via, for example, the transceiver 133. The power source 125 may aggregate this information from all such battery chargers electrically connected with the power distribution system 140 and issue requests for reactive power accordingly (e.g., based on the aggregate capacity).

Based on the apparent power and power factor of the distribution circuit 110n (from (1) and (2)), the real and reactive powers may be found. The incremental reactive power available may then be found using the power/current ratings of the distribution circuit 110n (which may be, for example, assumed, determined or input by a user). If, for example, the real and reactive powers are 10.6 W and 10.6 VAr (current leading voltage) respectively, and the power rating of the distribution circuit 110n is 15 W, the battery charger 120 cannot produce additional leading reactive power (current leading voltage) because, from (2), the apparent power is equal to the power rating of the distribution circuit $110n$. (One of ordinary skill, however, will recognize that the battery charger 120 can still produce lagging reactive power if needed.) If, for example, the real and reactive powers are 0 W and 0 VAr respectively, and the available power rating of the distribution circuit $110n$ is 15 W, the battery charger 120 has the capacity to produce 15 VAr of reactive power (of either sign).

In certain embodiments, the power source 125 may measure the PF (and determine whether voltage is leading or lagging current) using any suitable technique and broadcast a command for all battery chargers to produce, for example, 1 VAr of reactive power (having a sign opposite to the net reactive power). The power source 125 may then periodically measure the PF and broadcast commands for all battery chargers to increase the reactive power (of sign opposite to the net reactive power) produced until the net reactive power on the distribution system 140 has been sufficiently reduced and/or eliminated. In other embodiments, such as those having two-way communication between the power source 125 and any battery chargers 120, the power source 125 may request, in a known fashion, that respective battery chargers 120 produce/generate different amounts of reactive power (based on their respective capacities) provided, of course, that each battery charger reporting its capacity also provides identifying information that may distinguish it from others. Other control scenarios are also possible.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. A power system including at least one power distribution circuit comprising:
   at least one controller configured to determine a net reactive power on the at least one power distribution circuit and to issue at least one request for offsetting reactive power based on the determination to reduce the net reactive power on the at least one power distribution circuit.

2. The power system of claim 1 wherein the at least one controller is further configured to receive information from each of a plurality of remote devices and wherein the received information from each of the plurality of remote devices includes a capacity of the remote device to cause offsetting reactive power to be present on the at least one power distribution circuit.

3. The power system of claim 2 wherein the at least one request for offsetting reactive power is further based on the received information.

4. The power system of claim 3 wherein the received information from each of the plurality of remote devices further includes an identifier for the remote device.

5. The power system of claim 1 wherein the at least one request for offsetting reactive power includes a magnitude for and sign of the requested offsetting reactive power.

6. The power system of claim 1 wherein the at least one controller is further configured to periodically determine the net reactive power on the at least one power distribution circuit.

7. A power system for a plurality of power distribution circuits comprising:
   a power source configured to issue a plurality of requests for offsetting reactive power to reduce a net reactive power on the plurality of power distribution circuits, the plurality of requests each including a magnitude for and sign of the offsetting reactive power.

8. The power system of claim 7 wherein the power source is further configured to receive information from each of a plurality of remote devices, wherein the received information from each of the plurality of remote devices includes a capacity of the remote device to cause reactive power to be present on at least one of the plurality of power distribution circuits.

9. The power system of claim 8 wherein the plurality of requests for offsetting reactive power is based on the received information.

10. The power system of claim 9 wherein the received information from each of the plurality of remote devices further includes an identifier for the remote device.

11. The power system of claim 7 wherein the power source is further configured to determine a net reactive power on the plurality of power distribution circuits.

12. The power system of claim 7 wherein the magnitudes and signs of the plurality of requests are the same.

13. The power system of claim 7 wherein the magnitudes and signs of some of the plurality of requests are different than the magnitudes and signs of other of the plurality of requests.

14. A method comprising:
   periodically determining a net reactive power on at least one power distribution circuit; and
   issuing at least one request for offsetting reactive power based on the periodic determination to reduce the net reactive power on the at least one power distribution circuit.

15. The method of claim 14 further comprising receiving information from each of a plurality of remote devices, wherein the received information from each of the plurality of remote devices includes a capacity of the remote device to cause offsetting reactive power to be present on the at least one power distribution circuit.

16. The method of claim 15 wherein the at least one request for offsetting reactive power is further based on the received information.

17. The method of claim 16 wherein the received information from each of the plurality of remote devices further includes an identifier for the remote device.

18. The method claim 14 wherein the at least one request for offsetting reactive power includes a magnitude for and sign of the requested offsetting reactive power.

* * * * *